(12) United States Patent
Kaipa et al.

(10) Patent No.: US 11,782,874 B2
(45) Date of Patent: Oct. 10, 2023

(54) BOTTOM-UP PRE-EMPTIVE CACHE UPDATE IN A MULTI-LEVEL REDUNDANT CACHE SYSTEM

(71) Applicant: EMC IP Holding Company LLC, Hopkinton, MA (US)

(72) Inventors: Sirisha Kaipa, Cupertino, CA (US); Madhura Srinivasa Raghavan, Milpitas, CA (US); Neha R. Naik, Fairview, PA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 76 days.

(21) Appl. No.: 17/383,846

(22) Filed: Jul. 23, 2021

(65) Prior Publication Data

US 2023/0022351 A1    Jan. 26, 2023

(51) Int. Cl.
*G06F 16/11* (2019.01)
*G06F 12/0891* (2016.01)
*G06F 12/0811* (2016.01)
*G06F 16/182* (2019.01)

(52) U.S. Cl.
CPC ........ *G06F 16/119* (2019.01); *G06F 12/0811* (2013.01); *G06F 12/0891* (2013.01); *G06F 16/1824* (2019.01)

(58) Field of Classification Search
CPC ............... G06F 16/119; G06F 16/1824; G06F 12/0811; G06F 12/0891
See application file for complete search history.

(56) References Cited

U.S. PATENT DOCUMENTS

| | | | |
|---|---|---|---|
| 10,366,011 B1* | 7/2019 | Schneider | G06F 12/1018 |
| 2012/0198164 A1* | 8/2012 | Damodaran | G06F 1/3296 |
| | | | 711/E12.024 |
| 2015/0248455 A1* | 9/2015 | Sevilla | G06F 16/22 |
| | | | 707/736 |
| 2016/0162508 A1* | 6/2016 | Brosch | G06F 16/137 |
| | | | 707/692 |

FOREIGN PATENT DOCUMENTS

CN          104317736 A    *  1/2015

* cited by examiner

*Primary Examiner* — Hosain T Alam
*Assistant Examiner* — Anthony G Gemignani
(74) *Attorney, Agent, or Firm* — Staniford Tomita LLP

(57) ABSTRACT

Providing cache updates in a multi-node system through a service component between a lower level component and a next higher level component by maintaining a ledger storing an incrementing number indicating a present state of the datasets in a cache of the lower level component. The service component receives a data request to the lower level component from the higher level component including an appended last entry number accessed by the higher level component. It determines if the appended last entry number matches a current entry number in the ledger for any requested dataset. No match indicates that some data in the higher level component cache is stale. It then sends updated information for the stale data to the higher level component. The higher level component invalidates its cache entries and updates the appended last entry number to match a current entry number in the ledger.

20 Claims, 9 Drawing Sheets

Time t1:
Lookup of Dataset_2 and Dataset_4

Time t3:
After Client Lookup Dataset_1
Client receives Dataset_2 and Dataset_4 as appended data
and updates them in client cache

BOTTOM-UP PRE-EMPTIVE CACHE UPDATE IN A MULTI-LEVEL REDUNDANT CACHE SYSTEM

TECHNICAL FIELD

Embodiments are generally directed to cache memory systems, and more specifically to bottom-up pre-emptive updating of caches in a multi-cache system.

BACKGROUND

In a complex distributed service, such as namespace redirection service for a distributed storage cluster, it is imperative to introduce caching at the different levels in the service to optimize performance. These levels may be on the scale of different virtual machines (VMs) in the system each having a cache, or different service levels within a cache. All caching, however, imposes a cost involved in keeping the cache coherent and up-to-date with a backend system so that it can return accurate referral information to clients using the redirection service. Such a multi-level cache system significantly reduces the time taken to service the request, thus enhancing performance.

Traditional caches perform periodic time-based refreshes from the backend, and since the caches do not talk to one another, every level that maintains a cache needs to do the periodic refresh. Alternative and newer methods for cache refresh optimize this by utilizing asynchronous notification mechanisms from the backend to know when something changes and refresh the cache only at those times. These newer methods are not preferred, however, because they consume resources for every layer that maintains a copy of the cache.

What is needed, therefore, is a system and method to push cache update notifications in a bottom-up fashion through the different levels utilizing a cache, and as soon as the lowest layer maintaining the cache gets an asynchronous notification from the backend.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. DellEMC, NetWorker, Data Domain, Data Domain Restorer, and PowerProtect Data Manager (PPDM) are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
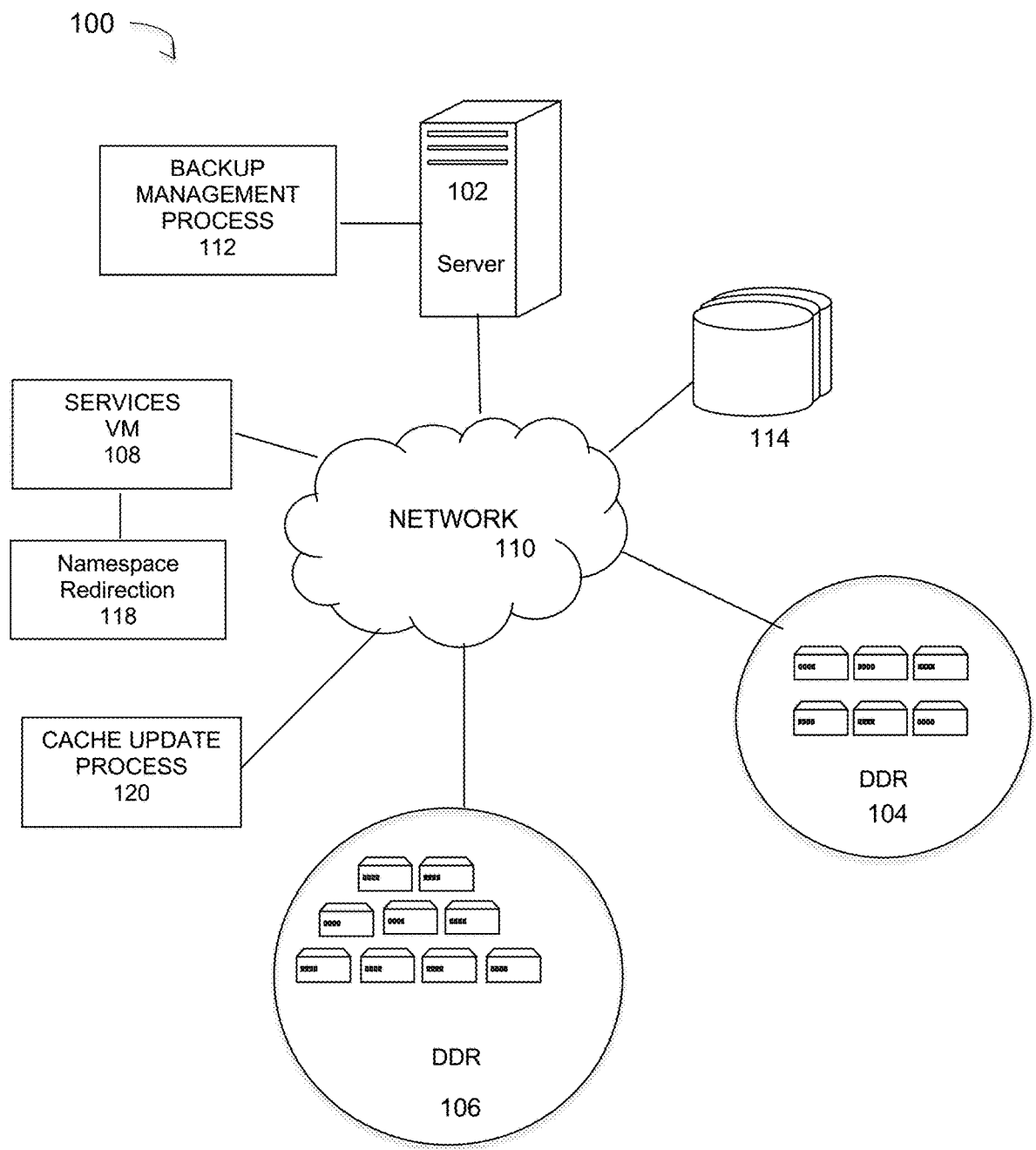
FIG. 1 is a diagram of a distributed storage cluster system implementing a bottom-up pre-emptive cache update process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. The computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup and data storage techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 is a diagram of a distributed storage cluster system implementing a bottom-up pre-emptive cache update process, under some embodiments. A network server computer 102 is coupled directly or indirectly to the network clients and/or servers 104 and 106 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The data sourced by system 100 may be stored in any number of other storage locations and devices, such as local client storage, server storage, or network storage (e.g., 114), which may at least be partially implemented through storage device arrays, such as RAID components.

Embodiments can be used in a physical storage environment, a virtual storage environment, or a mix of both, running a deduplicated backup program. In an embodiment, system 100 includes a number of virtual machines (VMs) or groups of VMs that are provided to serve as backup targets. Such target VMs may be organized into one or more vCenters (virtual centers) representing a physical or virtual network of many virtual machines (VMs), such as on the order of thousands of VMs each. The VMs serve as target storage devices for data backed up from one or more data sources, such as file system (FS) clients. Other data sources having data to be protected and backed up may include other VMs 104 and data in network storage 114. The data sourced by the data source may be any appropriate type of data, such as database data that is part of a database management system. In this case, the data may reside on one or more storage devices of the system, and may be stored in the database in a variety of formats.

For the embodiment of FIG. 1, network system 100 includes a server 102 that functions as a backup server by executing a backup management process 112 that automates the backup of network data using the target VM devices or the network storage devices 114. In an embodiment, the backup process 112 uses certain known full and incremental (or differencing) backup techniques along with a snapshot backup process that is used to store an image or images of the system(s) to be backed up prior to the full or incremental backup operations.

In an embodiment, the network system of FIG. 1 may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, server 102 may be implemented as a Data Domain Restorer (DDR) Deduplication Storage: server provided by DellEMC Corporation. However, other similar backup and storage systems are also possible. In a general implementation, a number of different users (or subscribers) may use backup management process 112 to back up their data on a regular basis to virtual or physical storage media for purposes of data protection. The saved datasets can then be used in data restore operations to restore any data that may be lost or compromised due to system failure or attack. For this embodiment data centers 104 and 106 may represent different DDR sites that function as sources and/or targets for data.

A system such as shown in FIG. 1 may have many different caches used by the various network elements, such as the server or servers 102, the client data centers 104, 106, and any application or service 108 that may be executing on the system. In many cases, these multiple components all process the same data and cache it using their respective caches. As the data is cached by these components, the data may change, get old, be relocated (e.g., through namespace redirection process 118), or be subject to a configuration change to the network itself. Any such change can cause the data in one or more of the caches to become outdated (stale). Typically, the caches for processes closest to the data (e.g., databases) have the newest data and caches for higher levels may contain stale data when the lower level caches update. It is important that the caches be notified of any stale data so that cache update processes can be used to prevent cache misses, which often impose excessive processing overhead.

Figure 2:
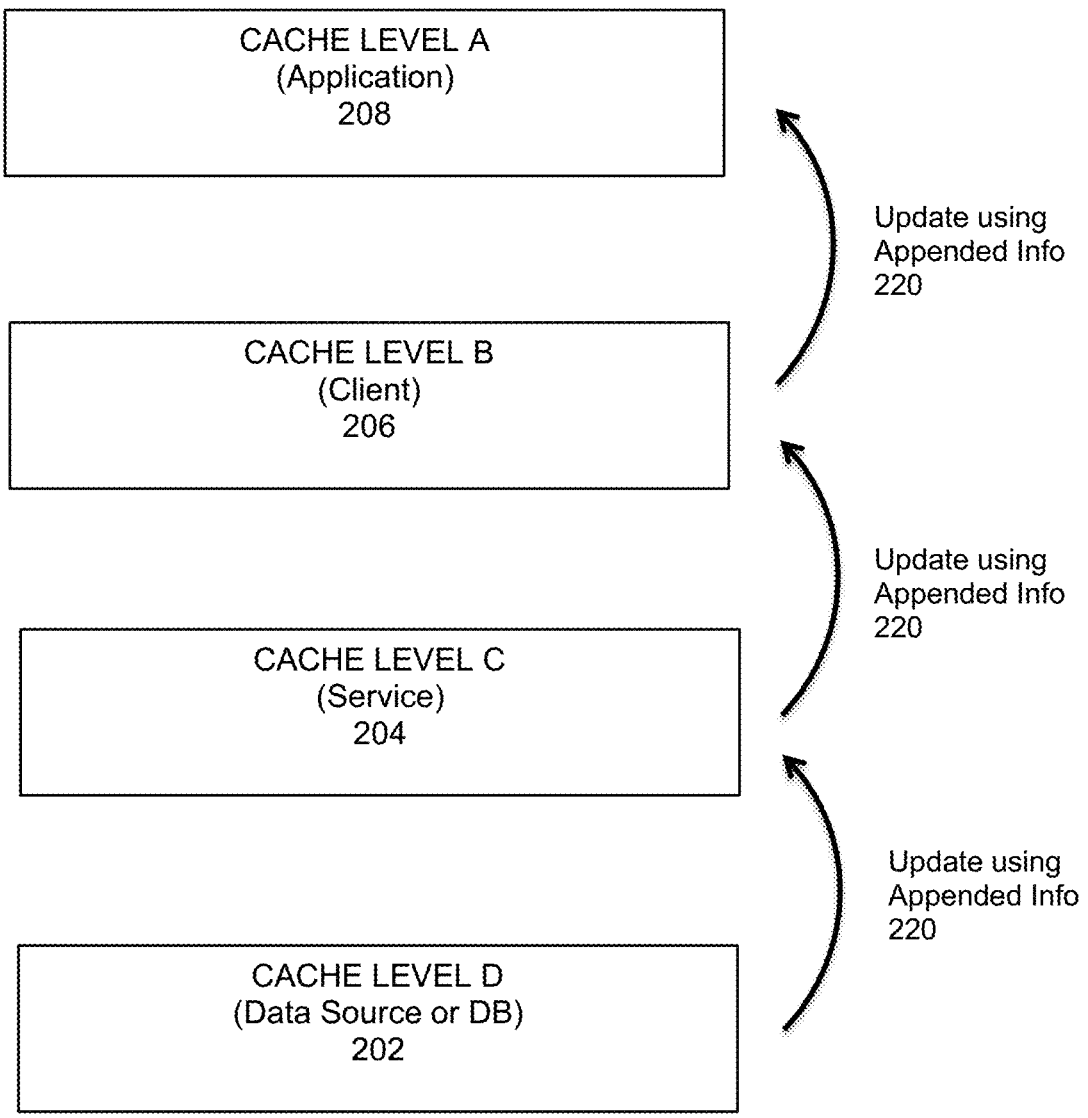
FIG. 2 illustrates a hierarchy of caches in a multi-level cache system that implements a bottom-up cache update process, under some embodiments.

In an embodiment, the system of FIG. 1 includes a cache update process 120 that provides a bottom-up pre-emptive cache update in the system 100, which has potentially several levels of multi-level caches. FIG. 2 illustrates a hierarchy of caches in a multi-level cache system that implements a bottom-up cache update process, under some embodiments. The example of FIG. 2 shows four caches of different levels denoted cache level A, 208, cache level B, 208, cache level C, 208, and cache level D, 202. For this example, cache level D is the lowest level cache in that it is used in or most closely associated with the VM of the actual data source, in this case a database. The next level cache, level C, is a next higher level cache, in this case a service (such as the namespace redirection service 118); cache level B is then the next higher level cache, such as for a client (e.g., a backup client), and cache level A is the highest level cache, such as for an application (e.g., a backup program).

FIG. 2 is provided for purposes of illustration only, and different numbers of caches used in different machines and processes may be used.

In an embodiment, the cache update process 220 updates the cascaded-level caches in a bottom-up process in which the lowest or lower level cache updates the higher levels by passing updated information as appended or 'piggybacked' data in response to any cached data request by the next higher level cache. Thus, as shown, cache level D updates cache level C; cache level C updates cache level B; and cache level B updates cache level A. The update process 220 strictly updates the multi-level caches in this bottom-up manner and only between pairs of lower and the next upper layer cache. An upper layer cache is a cache that calls the lower level cache for relevant data.

Figure 3:
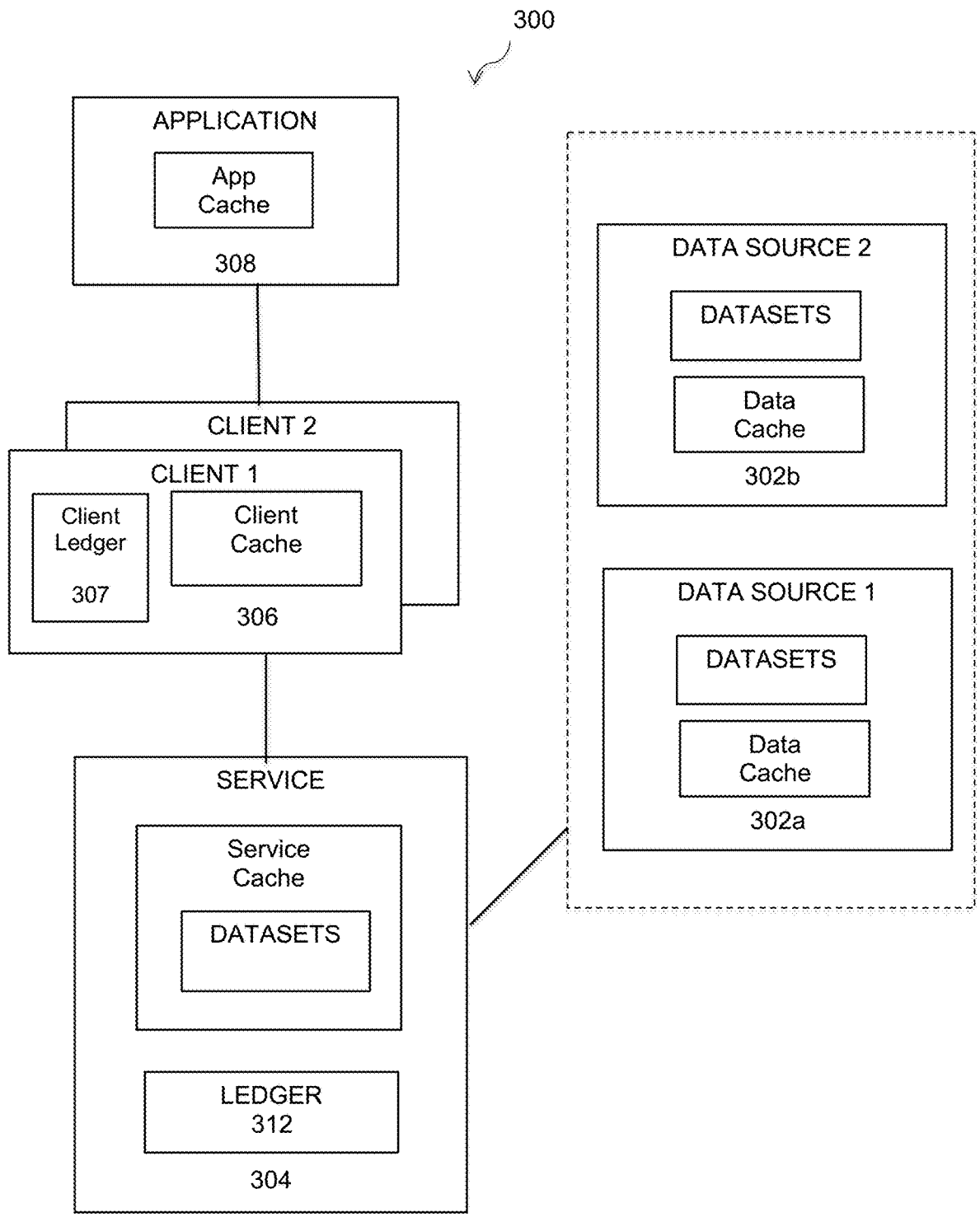
FIG. 3 is a block diagram of a hierarchical multi-node system using a bottom-up pre-emptive cache process, under some embodiments.

The configuration of system 300 of FIG. 3 mirrors that of FIG. 2 wherein the data sources 302a, 302b, contain the lowest level cache(s) 202, the service 304 contains the next higher level cache 204, the client 306 contains the next higher level cache 206 and the application contains the highest level cache 208, for an example of a four-level cache system.

In an embodiment, the cache update process 120 uses a ledger that maintains a cache state at the time of a cache lookup in the form of an incrementing number (numeric count). This ledger information is sent along with the data to higher level requesting caches to provide a basis for indicating changed or unchanged data in the lower level cache. In this way, the process provides an opportunistic notification of cache changes in a bottom-up manner in a multi-cache system.

FIG. 3 is a block diagram of a general multi-node system using a bottom-up pre-emptive cache process, under some embodiments. System 300 includes a number of data sources denoted Data Source 1 (302a) and Data Source 2 (302b) among many other possible data sources. The data sources each contain datasets and maintain their own cache. The data sources are accessed directly by higher level clients 302, with each client maintaining its own cache. These clients, in turn, are accessed by an application 308, which maintains its own cache. In a typical hierarchical system, the application itself may be accessed by yet a higher level system (not shown), and so on, so that a cascaded-cache system, such as shown in FIG. 2 is produced with each cache level making calls to a next lower level to access data in that level from the application down to the database or data source level, for the example of FIG. 3.

The data requested in the lower level may be in present in the lower level cache, in which case it is simply returned in response to the higher level request. If however, the data is not in or has been changed in the lower level cache, the cache entries in the higher level cache are considered stale, and the valid data must then be retrieved from the lower level component.

The higher level cache data can be rendered stale due to any change in the cached data prior to a higher level request, such as creation of new data, modification/change of the data, movement of data such as through redirection or migration, and a change in any relevant network or system configuration, which may alter access of that data in or through the lower level component. Other factors that cause a change in the accessed data can also be possible.

As shown in FIG. 1, various services for the VMs and data centers are provided by a services VM 108. As shown in FIG. 3, system 100 includes a service 304 that manages a service or application that processes the data such that cached data is changed on a deliberate or regular manner. One such service is a Namespace Redirection Service (NRS) that effectively moves data from one data source or client to another data source or client by renaming the original source to a different source. Another example service is a backup operation that moves source data to a target backup device, or a recovery operation that moves backed up data from the target backup device back to the source device. Other similar services and applications can also be considered that change the contents of the data or the pathname to access the data, or both.

When a data set is changed or migrated from one node to another in a cluster 302a or 302b (or otherwise rendered stale), the service 304 (e.g., NRS server) is notified of the event using a trigger which the service has subscribed to. However, the client 306 is still unaware of any change that has happened to the dataset location. To address this stale client cache, the next time the client does any lookup request, the service 304 can pass a hint of which entry to invalidate on the client cache. The service can detect that the client cache (at the next higher level) needs to be invalidated by maintaining a ledger 312 of which datasets got moved. This ledger can be a simple fixed sized circular log in memory. The ledger 312 keeps entries in the form of <entry no><dataset_id>. Whenever a dataset is moved from one node (or server) to another node, the service 304 will update the ledger 312. The entry number (entry no.) in the ledger is a continuously incrementing number. The client itself maintains its own ledger copy 307 storing its last accessed entry number. Whenever a client 306 comes to the service 304 for a lookup request, it will let the service know the last entry in the ledger it had read as stored in its own ledger 307. For a client which has connected for the first time this number will be 0. If the entry in the ledger 312 is greater than the last entry which the client has read, then at least some datasets have moved or changed since the last time the client connected to the service 304. As part of the lookup response the service 304 will attach (or piggyback) the newer entries to the client. The client can then invalidate any cached entries for those updated datasets. The client then updates its own ledger copy 307 to reflect this new entry number (such as from 0 to 1).

FIG. 3 illustrates a service component 304 maintaining a bottom-up notification between the data source level 302a and the client level 306. A similar service component can be provided between the client level 306 and the application level 308, and another similar service component can be provided between the application level 308 and any higher level, and so on, so that all levels with a cascaded multi-cache system can be included in the bottom-up pre-emptive update notification process. Such that any change to a dataset in the lowest level will cause a notification up the chain of cache levels to service any request from any higher or even the highest level component.

Figure 4:
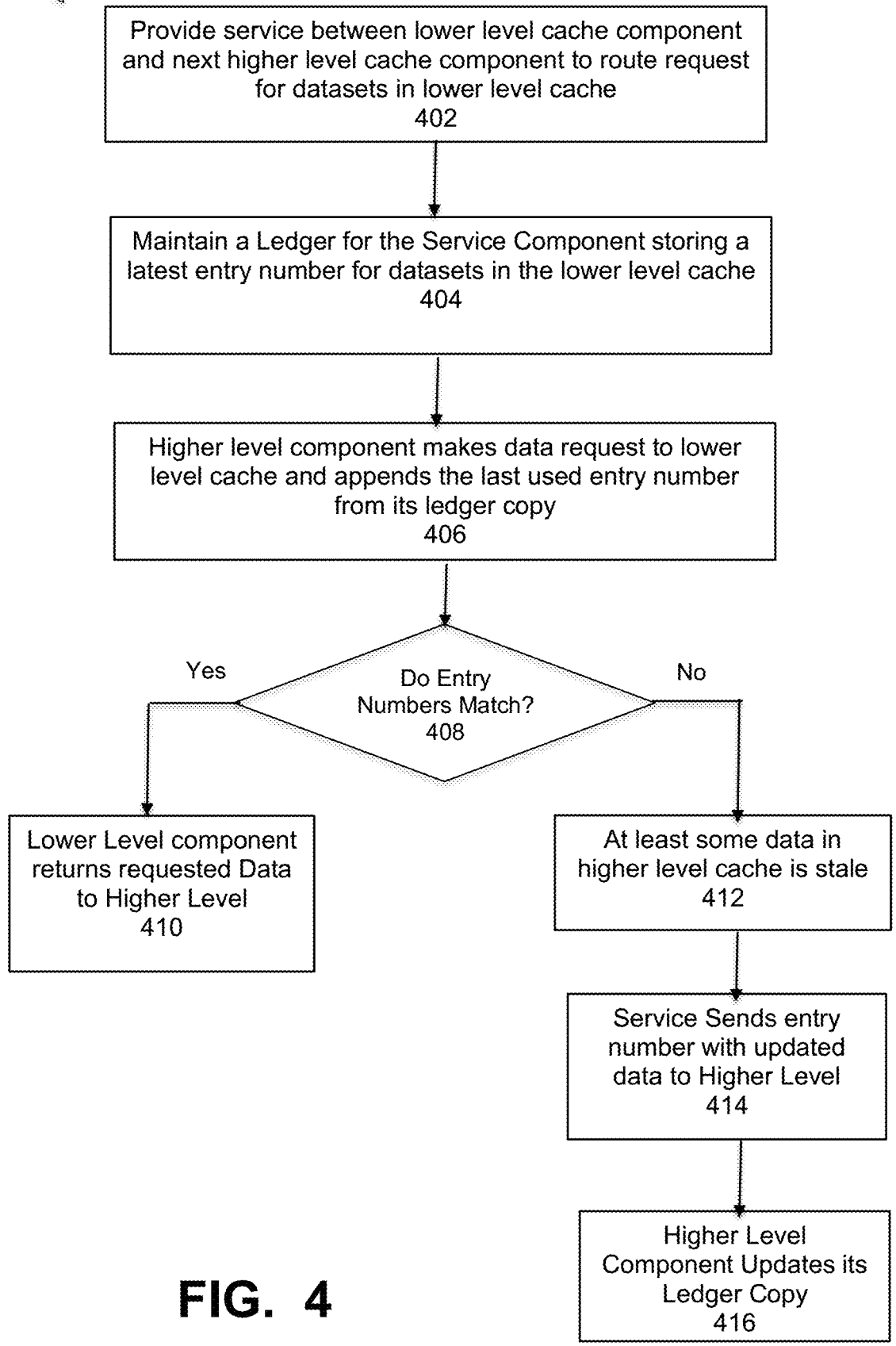
FIG. 4 is a flowchart that illustrates a method of performing bottom-up pre-emptive cache updates, under some embodiments.

FIG. 4 is a flowchart that illustrates a method of performing bottom-up pre-emptive cache updates, under some embodiments. Process 400 of FIG. 4 begins with providing a service component 301 between a lower level cache component (e.g., data source 302a) and the next higher level cache component (e.g., service 304) to route requests for datasets in lower level cache by the higher level component, step 402. The service component 304 maintains a ledger 312 storing an incrementing entry number indicating a present state of the datasets in the lower level cache, step 404.

When making a data request to the lower level component, the higher level component appends the last used entry number from its ledger copy 307, step 406. This appended number corresponds to the last entry that the higher level component has read from the lower level component, and is 0 for a first request from the higher level component.

If, as determined in decision block 408, the appended entry number matches the current service ledger entry number, then the lower level component returns the requested dataset from its cache, step 410. If, however, entry numbers do not match, then this indicates that at least some data in the requested dataset is stale in the higher level cache, 412. The service then obtains the new or updated data from the client and sends this data to the higher level component, step 414. The higher level component then updates the entry number in its ledger copy to reflect the latest data it has accessed from the lower level component, step 416.

In an embodiment, the data from the lower level component can be sent to the higher level component through the service upon request from the higher level component, in which case, the service maintains a present copy of the lower level datasets in its own cache. Alternatively, the lower level component can send the data to the higher level component directly without going through the service component, and the service component would then append the current ledger entry number as part of the data in response to the request.

In a specific example embodiment, the service 304 is a namespace redirection service, and the change in the cached datasets comprises a move from one node to another node within system 300. For this embodiment, system 100 of FIG. 1 is a distributed computer network that implements a distributed file system (DFS) that is distributed on multiple file servers or multiple locations. The DFS allows programs to access or store isolated files as they do with the local files. The files shares on multiple file systems are grouped into a common folder, referred to as a namespace, and a namespace server is a network server or domain controller that hosts a namespace. In a such a cluster management system or a datacenter with multiple clients, typically the datasets are hosted on multiple servers. A dataset is a collection of directories and files which pertain to a specific client, a specific backup or specific a storage unit. The namespace server serves the client's lookup requests providing it with referral information for a given dataset. The clients end up caching this referral information in order to improve the performance for subsequent data access requests and also to directly connect to the nodes instead of going through the redirection service for subsequent lookups. If any such dataset gets migrated to a different server or a node in a cluster, this cache information needs to be invalidated on the namespace server as well as in the client.

As shown in FIG. 1, various services for the VMs and data centers are provided by a services VM 108. The namespace redirection service (NRS) is an example of one such service. However, it should be noted that although embodiments are described with respect to a namespace redirection service, embodiments are not so limited, and any application that utilizes or impacts caches through movement or modification of data in a multi-level cache system can be used.

For the example embodiment of FIG. 1, in the NRS system 100, every client maintains a redirection cache to remember which Data Domain (or similar) server to route requests to for a specific dataset. For a dataset that is not in its cache, the client will send a lookup request to the NRS. The NRS itself maintains a cache of the recently looked up datasets and relevant information for these datasets. If the dataset being looked up by the client exists in the NRS cache (possibly populated by some other client issuing a lookup request some time in the past), the NRS returns the redirection information for the dataset, along with the current NRS ledger number. The ledger number is similar to a generation number specific to a ledger (e.g., 312) that the NRS maintains to track dataset migrations across the different datasets and Data Domain servers. Along with the lookup result, the NRS also returns to the client, the delta of datasets previously looked up by the client that are now invalidated due to relocation or migration of the datasets. Using the current ledger number, and the last known ledger number from the client (e.g., from client ledger 307), the NRS can compute what all datasets need to be invalidated in the client cache and accordingly report these datasets as invalidated to the client. The computation of the client cache entries to be invalidated by comparing the client and NRS ledger numbers provides a key mechanism of the cache update process 120.

If the dataset being looked up by the client does not exist in the NRS cache, the NRS will perform a database read to fetch the redirection information for the dataset and will apply the same mechanisms to send updates for other datasets the client has previously looked up. The advantage of this approach is that the client cache gets updated proactively, without the client having to do frequent database reads to update its cache. Furthermore, it can drastically reduce timeout issues seen by backup applications due to stale client redirection caches.

Figure 5:
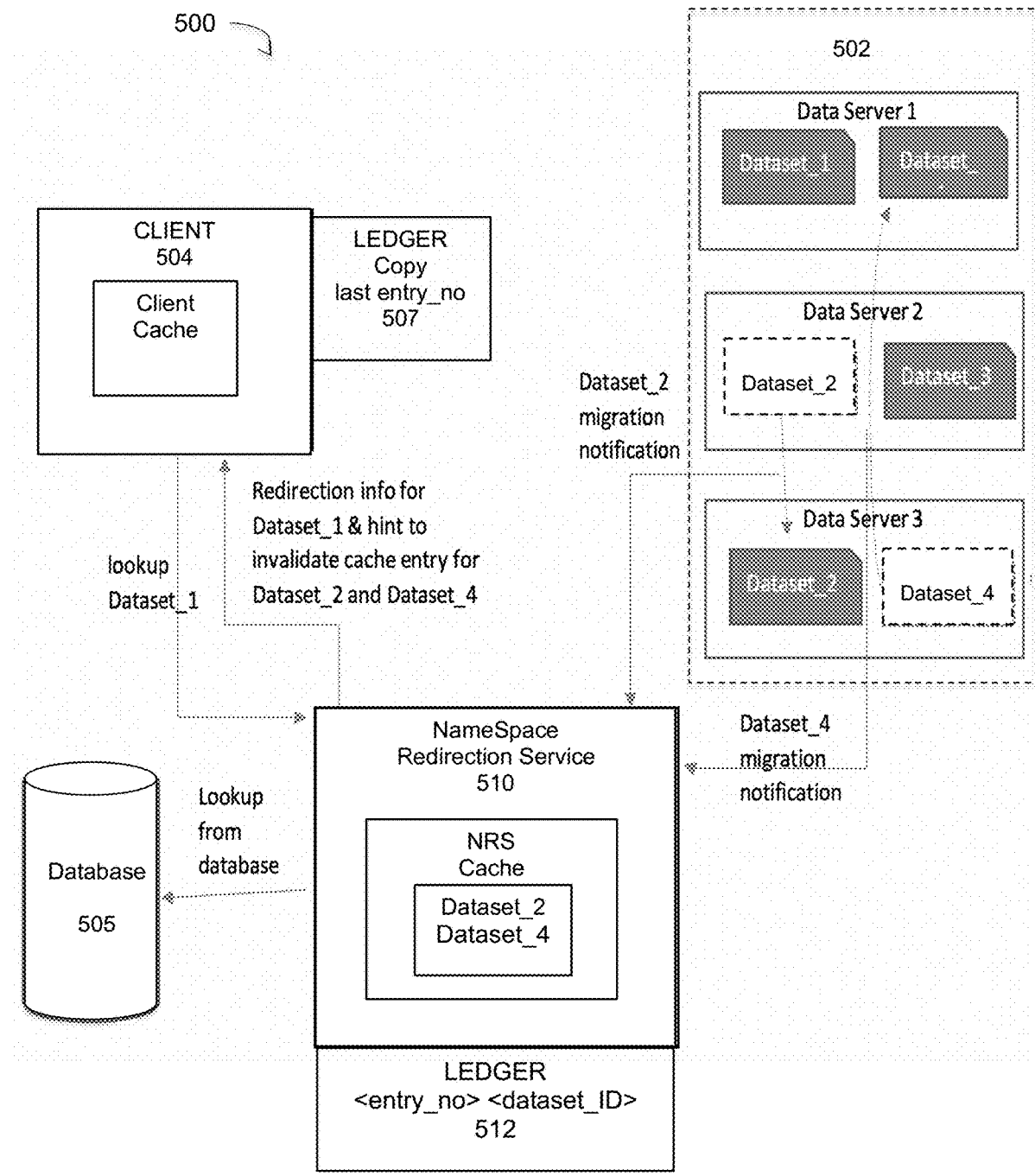
FIG. 5 is a block diagram illustrating implementing a cache update process in an example namespace redirection service application, under some embodiments.

FIG. 5 is a block diagram illustrating implementing a cache update process in an example NRS application, user some embodiments. Diagram 500 of FIG. 5 depicts the Namespace Redirection Service and how it interacts with clients and also gets notifications about dataset migrations on the different data servers.

As shown in FIG. 5, the data sources 502 include three data servers, denoted Data Server 1, Data Server 2, and Data Server 3, each having at least two datasets each cached in respective data caches, with some datasets possibly common among the datasets, such as Dataset_2 (common to Data Server 2 and Data Server 3) and Dataset_4 through copying or migration. These datasets are accessed through requests from client 504, which maintains its own client cache. The NRS server 510 keeps track of changes to the cached dataset for the data sources 502 for response to requests from client 504. The NRS server 510 maintains ledger 512 that stores the current entry_no for each dataset_ID for the data sources 502. When data within any dataset is moved by redirection, the NRS server 502 increments the corresponding entry number for that dataset by one.

For the example shown in FIG. 5, the Dataset_2 and Dataset_4 both migrate to different data servers, and notifications are sent to the NRS server 510, and the NRS cache stores the newly updated data for the changed datasets 2 and 4 (as shown). For this example, if the client requests data for Dateset_2 and/or Dataset_4 by sending its last entry number from its ledger copy 507 to the NRS server 510. It will receive redirection information for these migrated datasets and a hint or indication to the client to invalidate these cache entries that is sent along with the updated data for these datasets. The NRS server may perform a lookup from database 505 for this updated data. Likewise, the client 504 may request data from Dataset_1, which has not been migrated, in which case this data is returned directly from the Data Server 1 cache to the client.

In response to the data request for Dataset_1 by client 504, however, the service also provides a hint that Dataset_2 and Dataset_4 has been migrated if a ledger number difference is detected. In this case, the client will receive the redirection information for Dataset_2 and Dataset_4 as well as the request Dataset_1 information. Thus, regardless of the looked-up data, all updated data information is sent in response to a lookup request by a higher level component whenever a ledger number discrepancy exists. That is, for any request, the higher level component will receive information for all updated datasets even if the requested dataset was not updated.

In the case of a redirection service, this information or data returned to the higher level component from the lower level component comprises the redirection information for the dataset, which may be a new path or other updated location information. The information does not include the dataset or the data itself, but rather the information provided by the service—in this case the namespace redirection information. In the case of any other type of service, the information returned by the update process 220 likewise comprises metadata or data provided or managed by that service, and not necessarily the data processed by that service.

Figure 6A:
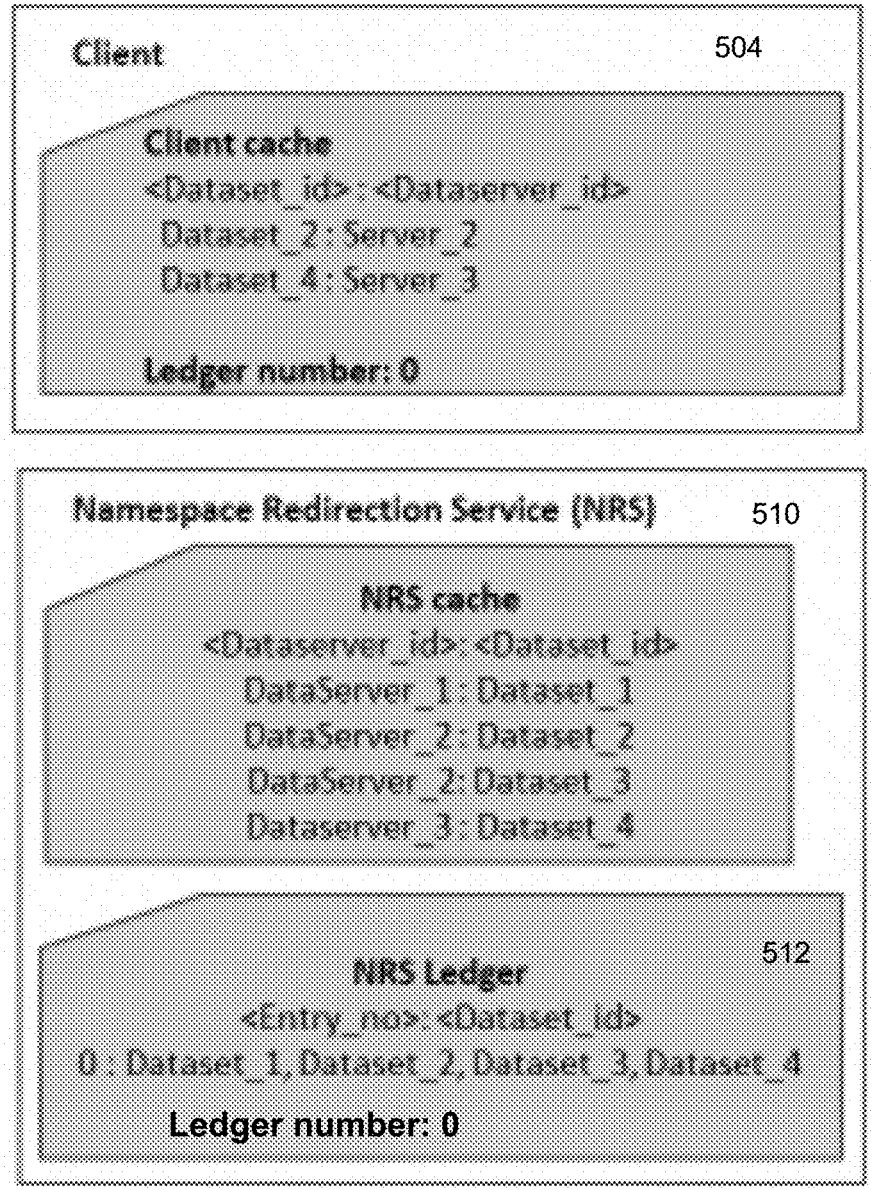
FIGS. 6A to 6C provide a time sequence diagram illustrating cache and ledger entries during the lookup and cache updates for the dataset migration example of FIG. 5, with FIG. 6A illustrating a first point in time, T1, FIG. 6B illustrating a second point in time, T2, and FIG. 6C illustrating a third point in time, T3.
Figure 6A:
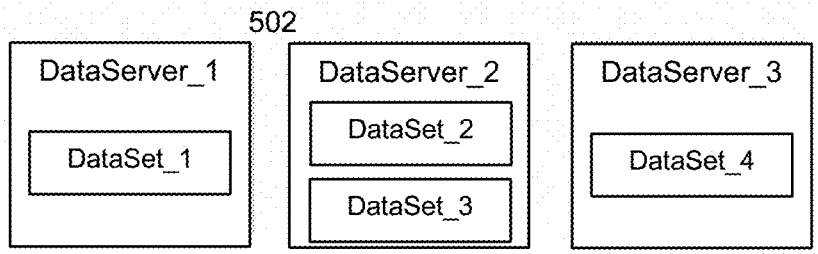
Figure 6B:
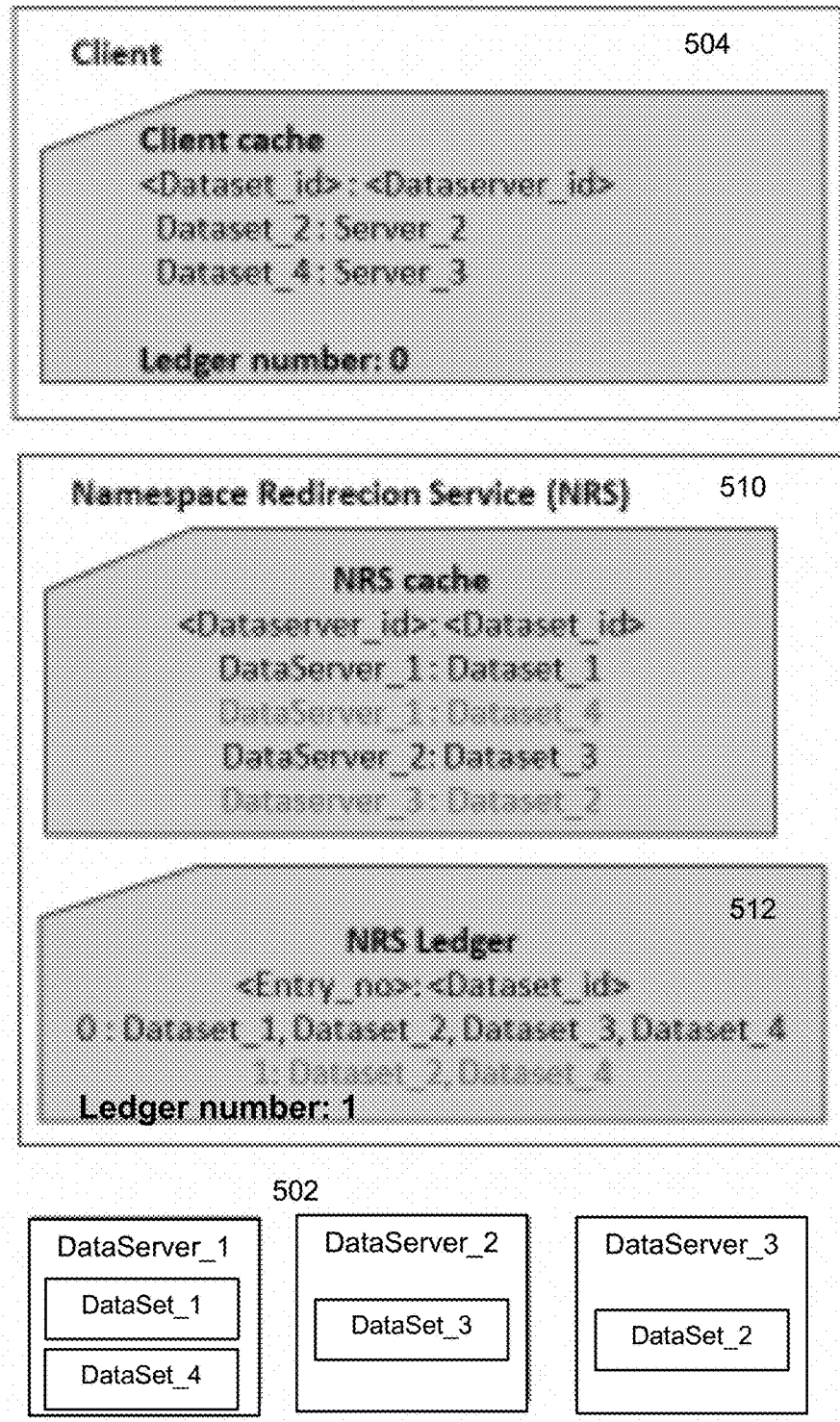
Figure 6C:
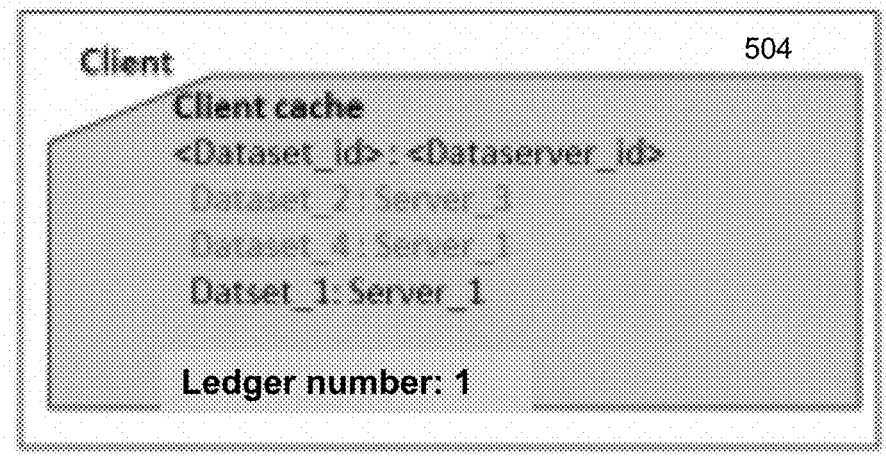
Figure 6C:
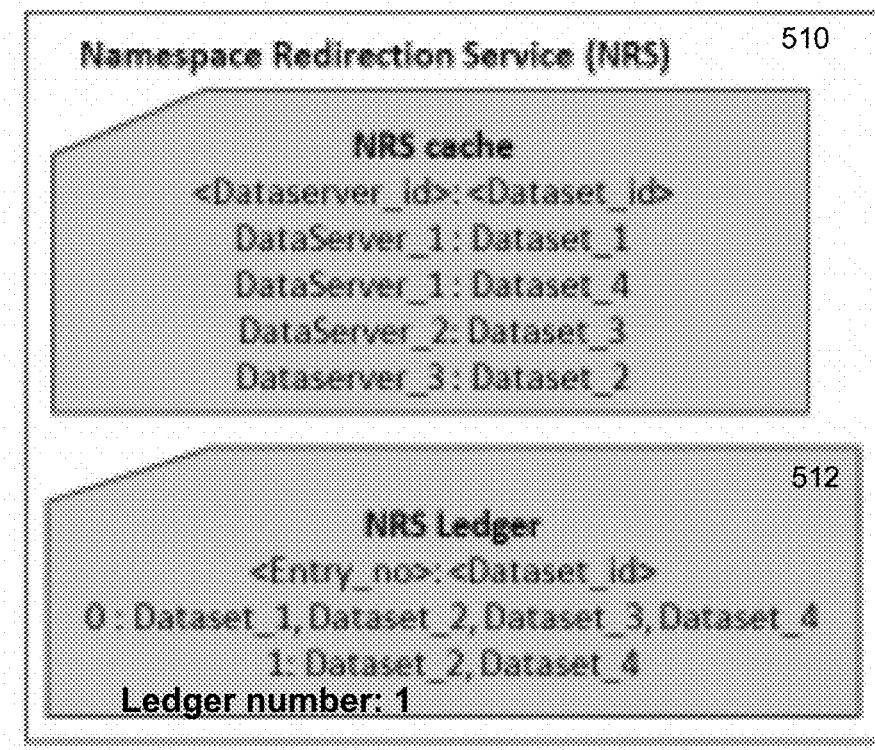
Figure 6C:
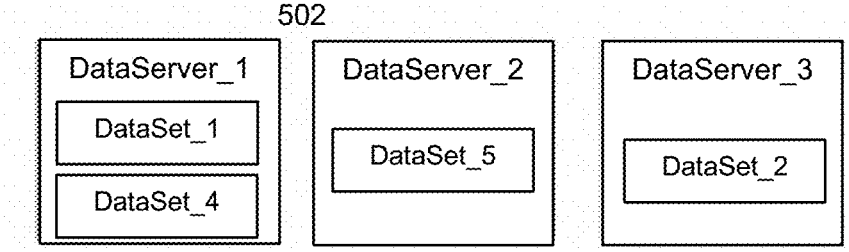

FIGS. 6A to 6C provide a time sequence diagram illustrating cache and ledger entries during the lookup and cache updates for the dataset migration example of FIG. 5. As shown in these diagrams, the existing client cache entries of the datasets are pre-emptively updated by the appended information from the NRS server 510 upon subsequent lookup of non-related data lookups.

FIG. 6A illustrates a first point in time, t1, in which the client 504 looks up the namespace server for re-direction information on Dataset_2, and Dataset_4 from data sources 502 and stores this in its client cache with the starting ledger number 0. All the entries are also present in the Namespace Redirection Service (NRS) cache and also in the NRS ledger 512. In this case, the ledger number in the service (NRS ledger) is 0, as is the ledger number in the client cache.

FIG. 6B illustrates a second point in time, t2, in which dataset_2 and dataset_4 are migrated to Dataserver_3 and Dataserver_4 respectively. The NRS server 510 will get a trigger when this migration happens and it will update its cache. It will also add another entry with this updated information in the ledger 512 incrementing the ledger number to 1 from the starting number of 0. Thus, as shown, the ledger number in the service (NRS ledger) is 1, while the ledger number in the client cache remains 0.

FIG. 6C illustrates a third point in time, t3, in which the client 504 looks up Dataset_1, it passes the ledger number 0 from its ledger copy 512 to the NRS server 510. The NRS server will check with its ledger 512 and find that the client has not been notified of the cache updates because the ledger number passed by the client is '0' whereas NRS ledger has number as '1'. So it sends the latest/updated redirection information, such as in the form of an updated file system (directory) path of Datasets_2 and 4 as appended data to the client along with Dataset_1 redirection information. The client 504 then updates this ledger number and its cache with all the latest information for all three datasets 1, 2 and 4. In this case, the ledger number in the service (NRS ledger) remains 1, as is the ledger number in the client cache is now updated to 1 from 0.

Figure 7:
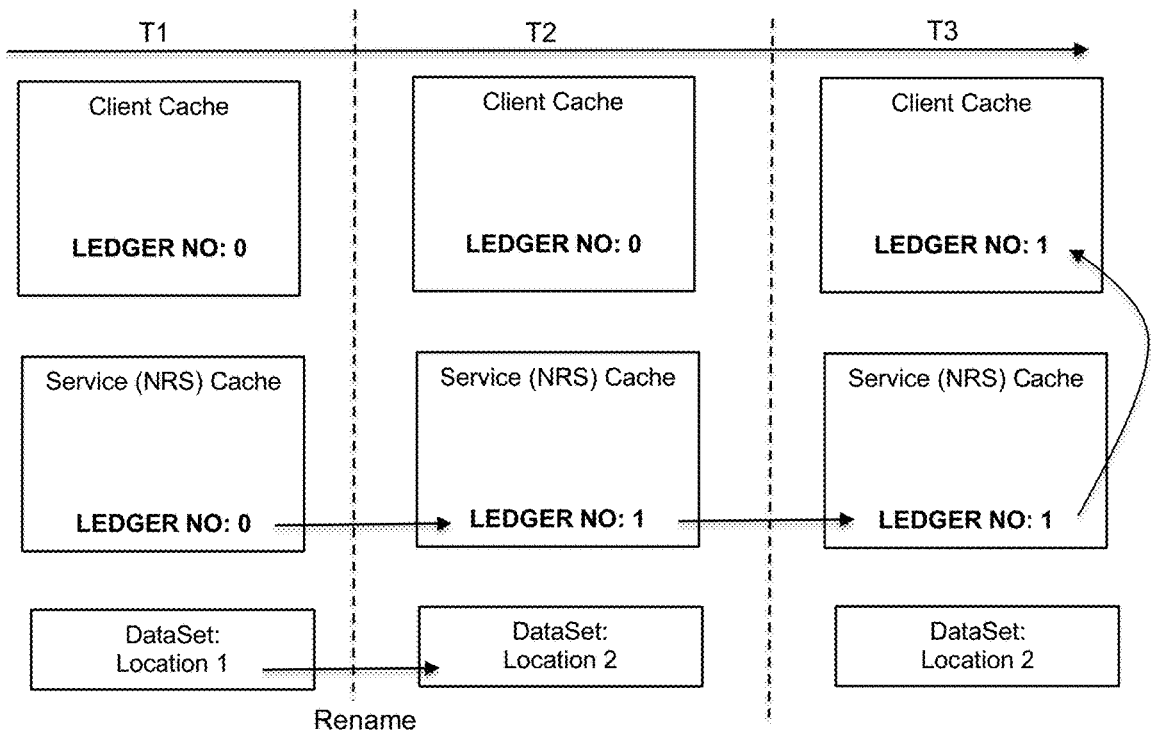
FIG. 7 is a diagram that summarizes the ledger number update process for the examples of FIGS. 6A to 6C, under an example embodiment.

FIG. 7 is a diagram that summarizes the ledger number update process for the examples of FIGS. 6A to 6C, under an example embodiment. FIG. 7 illustrates the contents of the ledger numbers for the client and NRS caches for along the timeline from T1 to T3 in relation to a change in a specific dataset. At time T1, there is no change in the dataset and thus the NRS cache and the client cache both have a ledger number 0. Between time T1 and time T2, the dataset may have been renamed causing a change of location information. In this case, the NRS ledger is updated to ledger no. 1, and at this time (T2) the higher level client cache has not been updated and thus has stale information for this dataset. At time T3, such as after a dataset request for dataset 1 or any other dataset by the client, the client is sent the updated information (i.e., new location information) for the dataset, and the client ledger is then updated to reflect the current NRS ledger number, i.e., from 0 to 1. Thus, the client changes both its cache contents and the ledger number in response to a change in the dataset.

In general, there are several ways in which the namespace service can map the per client information either using generation number or client mapping in order to figure out the datasets looked up by each client. This currently can be implemented with Data Domain proprietary boost protocol and can be extended to NFS as well along with the existing NFS client invalidation algorithm.

As described above, in an embodiment, system 100 processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

Figure 8:
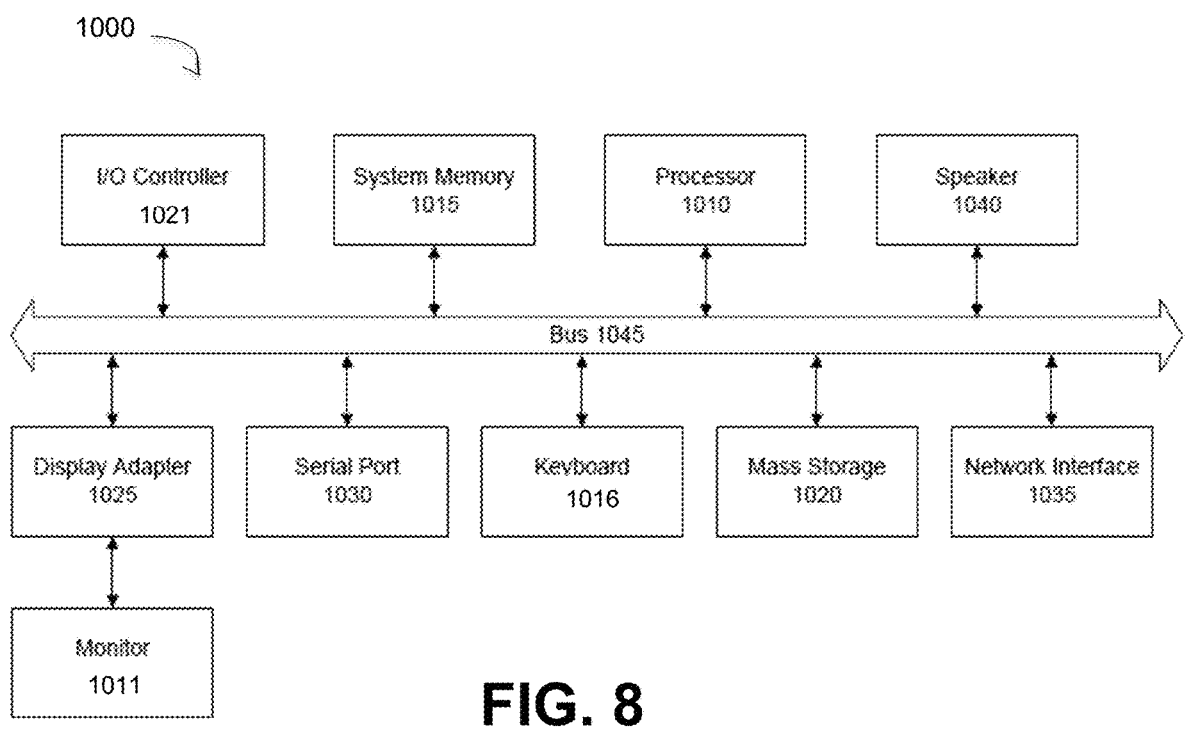
FIG. 8 is a block diagram of a computer system used to execute one or more software components of a system implementing a bottom-up pre-emptive cache update process, under some embodiments.

FIG. 8 is a block diagram of a computer system used to execute one or more software components of a system for performing some of the processor-based functions, under some embodiments. The computer system 1000 includes a monitor 1011, keyboard 1016, and mass storage devices 1022. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is but one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing cache updates to a client in a hierarchical multi-node system, comprising:
   providing a service component between a lower level component and a next higher level component;
   first maintaining a ledger in the service component storing an incrementing entry number indicating a present move state of the datasets in a cache of the lower level component, the ledger storing a dataset ID of each moved dataset with a respective ledger entry number, and wherein the incrementing occurs each time a dataset is moved;
   second maintaining, in the client, a copy of the ledger for comparison with the first maintained ledger to determine if any datasets have changed since a last time the client connected to the service component;
   receiving a data request to the lower level component from the higher level component including an appended last entry number accessed by the higher level component;
   determining if the appended last entry number matches a current entry number in the ledger for any requested dataset, wherein no match indicates that at least some data in the higher level component cache is stale;
   sending, if there is no match, updated information for the stale data to the higher level component;
   invalidating cache entries for the stale data in the cache of the higher level component; and
   updating, in the higher level component, the appended last entry number to match a current entry number in the ledger for the updated data.

2. The method of claim 1 wherein the ledger comprises a fixed-size circular log containing entries comprising an entry number and dataset ID for each dataset cached in the lower level component.

3. The method of claim 2 wherein the entry number is an integer number starting at value zero for a new dataset that increases monotonically upon each change of data for a cached dataset.

4. The method of claim 3 wherein the client maintained copy of the ledger stores entry numbers for a last entry number accessed from the lower level component and that is included with the request as the appended last entry number.

5. The method of claim 1 wherein the stale data in the higher level component is created by at least one of a modification of a requested data set, a move of the requested dataset from one node to another node, creation of the new dataset, or a change in system configuration containing the nodes.

6. The method of claim 5 wherein the service component comprises a namespace redirection service managing a movement of the requested dataset among nodes in the system.

7. The method of claim 6 further comprising:
   receiving a lookup request from a client to access data in the first node including data that may have been migrated and thus rendered stale in a cache of the first node;
   including in the lookup request, an appended entry number for a last entry in the ledger read by the client for the first node; and
   determining if a current entry in the ledger is greater than the appended entry number, and if so, sending an indication to the client to invalidate its cache entries for the first node.

8. The method of claim 1 wherein a change of any dataset in the datasets in the cache of the lower level component causes the sending of updated information for the stale data to the higher level component regardless of the requested dataset.

9. The method of claim 1 wherein the system comprises a backup system comprising a backup server moving data between one or more data sources and one or more storage targets using deduplicated backup processes.

10. A method of managing migration of data from a first node to a second node in a multi-node clustered network system having a distributed file system (DFS), comprising:
- notifying a namespace redirection server (NRS) upon migration of data from the first node to the second node, the NRS first maintaining a ledger as a fixed size circular log storing a monotonically increasing entry number for a latest dataset cached in the first node, the ledger storing a dataset ID of each moved dataset with a respective ledger entry number, and wherein the incrementing occurs each time a dataset is migrated;
- second maintaining, in a client, a copy of the ledger for comparison with the first maintained ledger to determine if any datasets have changed since a last time the client connected to the service component;
- receiving a lookup request from a client to access data in the first node including data that may have been migrated and thus rendered stale in a cache of the first node;
- including in the lookup request, an appended entry number for a last entry in the ledger read by the client for the first node; and
- determining, in the NRS server if a current entry in the ledger is greater than the appended entry number, and if so, sending an indication to the client to invalidate its cache entries for the first node.

11. The method of claim 10 further comprising updating the entry number in the ledger upon any migration of the cached data set from the first node.

12. The method of claim 10 further comprising:
- invalidating, in the client, cache entries for the first node in response to the indication from the NRS server; and
- receiving information from the NRS server to access the updated dataset for the migrated data by the client.

13. The method of claim 12 further comprising:
- maintaining, in the client, the ledger copy storing an entry number for the last entry for appending to the lookup request; and
- updating the last entry number stored in the ledger copy of the client appended entry to match the entry number of the number for the migrated data.

14. A method of managing migration of data in a namespace redirection service (NRS) from a first node to a second node in a multi-node clustered network system having a distributed file system (DFS), comprising:
- looking up, by a client, the NRS for re-direction information on a dataset migrated from a first node to a second node, and storing this in its client cache with a starting entry number;
- storing, in a ledger of the NRS, a latest entry number for datasets accessed on the first node by the client, the ledger storing a dataset ID of each moved dataset with a respective ledger entry number, and wherein the incrementing occurs each time a dataset is migrated;
- maintaining, in the client, a copy of the ledger for comparison with the first maintained ledger to determine if any datasets have changed since a last time the client connected to the service component;
- receiving, in the NRS, a trigger upon migration of the dataset from the first node to the second node, and updating a cache in the NRS, accordingly;
- incrementing the entry number in the NRS ledger upon the migration;
- receiving in the NRS, upon the looking up step, the starting entry number stored by the client and verifying whether the received ledger number matches the latest entry number in the NRS ledger to indicated whether or not the client has been notified of the cache updates; and
- sending, if there is no match, redirection information for the requested data as appended data to the client.

15. The method of claim 14 further comprising updating, in the client, the starting entry number to match the latest entry number in the NRS ledger.

16. The method of claim 14 wherein the ledger comprises a fixed-size circular log containing entries comprising an entry number and dataset ID for each dataset cached in the lower level component.

17. The method of claim 16 wherein the entry number is an integer number starting at value zero for a new dataset that increases monotonically upon each change of data for a cached dataset.

18. The method of claim 14 wherein the system comprises a multi-node clustered network system having a distributed file system (DFS).

19. The method of claim 18 wherein the system comprises a backup system comprising a backup server moving data between one or more data sources and one or more storage targets using deduplicated backup processes.

20. The method of claim 18 wherein the method comprises a bottom-up pre-emptive cache update process for a distributed storage cluster system.

* * * * *